United States Patent [19]
Gerber

[11] 3,919,830
[45] Nov. 18, 1975

[54] ROW CROP ATTACHMENT FOR FORAGE HARVESTERS

[76] Inventor: Jerome J. Gerber, Murdock, Kans. 67111

[22] Filed: Nov. 26, 1973

[21] Appl. No.: 419,138

[52] U.S. Cl. .................. 56/13.6; 56/14.3; 56/14.5; 56/95; 56/119
[51] Int. Cl.² .................................. A01D 45/02
[58] Field of Search ............ 56/13.6, 14.3, 14.5, 60, 56/94, 95, 119

[56] References Cited
UNITED STATES PATENTS

| 954,438 | 4/1910 | Jeschke | 56/95 |
|---|---|---|---|
| 2,571,224 | 10/1951 | Edwards | 56/119 X |
| 2,648,943 | 8/1953 | Shafer et al. | 56/14.3 X |
| 2,788,629 | 4/1957 | Becker | 56/119 X |
| 2,836,026 | 5/1958 | Gray et al. | 56/119 |
| 2,933,876 | 4/1960 | Davin, Jr. | 56/119 |

Primary Examiner—J. N. Eskovitz
Attorney, Agent, or Firm—John H. Widdowson

[57] ABSTRACT

A row crop attachment for a forage harvester has a frame mountable on a forage harvester. It has a vertically disposed conveyor, a cutter, a transverse conveyor operatively adjacent the vertically disposed conveyor, a stalk guide extending forward of the frame, and a stalk mover on an upper portion of an outer stalk guide. The latter can be employed with the common and conventional row crop attachment for forage harvesters.

11 Claims, 12 Drawing Figures

ROW CROP ATTACHMENT FOR FORAGE HARVESTERS

BACKGROUND OF THE INVENTION

The invention is related to row crop attachments for forage harvesters. Numerous types of forage harvester machines are known in the prior art; they are either of the self-propelled type or the pulled type which is drawn behind a tractor. These harvesters are constructed so they can be fitted with a number of different attachments so the basic forage harvester machine to perform a number of functions. One such attachment usable with the forage harvester machine is a row crop attachment which is used to harvest grains and the like which are planted in rows. The known prior art row crop attachments have forwardly extending stalk guide members on opposite sides of the attachment and a forwardly extending center member; or in the case of the self-propelled type forage harvesters, possibly two forwardly extending center members. A gathering chain apparatus is constructed in the forward extending members to grasp the lower portion of the crop stalks to convey them rearwardly to a knife or the like which cuts the stalk and then onto a conveyor of the forage harvester which passes the stalks into the machine. The gathering chains on these row crop harvesters perform the function of grasping the crop stalk in a positive relation and moving it into the machine; however, these gathering chains are a great source of trouble as they have a large number of small moving parts and are constantly exposed to abrasive material and wear quickly. When gathering chains become worn, slightly, the machine must be adjusted to maintain the complex apparatus operational. The main disadvantage of gathering chains is that as they become worn they tend to be less effective in grasping the crop stalks and they tend to easily jump out of their mounting tracks and jam the mechanism which results in loss of time in repairing machine. Another long realized disadvantage of the prior art row crop harvesters is that the row which is adjacent to the remaining row of the field will tend to cling to the remaining row as the leaves drag on each other or otherwise touch or are twisted with the leaves or stalks, of the remaining rows. In the prior art row crop attachments the crop stalks will be retained by the gathering chains once they have been engaged; however, the upper portion of the stalks will bend around the upper portion of the stalk guides to the outside thereof or in the direction of the row adjacent to the row to be cut as the machine moves through the crop. Once some of the stalks have wrapped around bent over the stalk guide, then the machine must be stopped and these stalks removed by hand or placed so they will pass into the harvester; otherwise, additional stalks will pile up on those already misplaced and the machine will become plugged and thus inoperative. On the self-propelled forage harvesters this fault can occur on either or both sides thereof if the machine is driven through an interior portion of a field where standing rows are adjacent to both sides of the machine; in the drawn type forage harvesters this fault can occur on the side of the machine adjacent to the standing rows of the crop. No known row crop attachment is constructed so that it will move the row being cut away from the adjacent standing row as the row to be cut moves into the machine.

SUMMARY OF THE INVENTION

In one preferred specific embodiment, (1), an attachment structure for a row crop harvester is provided which has a frame mountable with the frame of a forage harvester and including a generally vertically disposed screw conveyor having a pair of augers on opposite side portions of the frame, the augers have rotary knives on their lower portions for cutting crop stalks, tranversely disposed screw conveyor has an auger mounted with the frame adjacent to an upper portion of the vertically disposed augers to move material to a center portion of the row crop attachment, a stalk guide attached to the frame having horizontally adjustable portions extending forwardly from opposite sides of the frame, a center portion extending forwardly from the frame between the outer portions to receive rows of a crop between the inner portions and the outer portions and further, and a stalk moving apparatus with a rotatable member mounted on an upper portion of one of the outer stalk guides to move and guide crop stalks into one of the vertically disposed augers. The row crop attachment is constructed and adapted to be moved through a row crop receiving rows of a crop between the stalk guide outer portions and the stalk guide center portion with the stalks being cut on their lower portion by the rotary knives, having their lower or butt end portions raised by the vertical disposed augers and moved to a center portion of the attachment by the transverse auger. The stalk moving apparatus moves stalks in the row to be cut away from the standing rows of the crop adjacent to the stalks of the row to be cut so the stalks to be cut move neatly into the vertically disposed augers and the transverse auger. A rotated knock-down roller is a part of the stalk moving apparatus and it bends the tops of the stalks forward as they are cut and after cutting aids in moving them into the forage harvester.

In another embodiment, (2), of this invention the stalk moving apparatus portion of the row crop attachment is applied to one stalk guide of a conventional row crop harvester. And in another embodiment, (3), of this invention, the stalk moving apparatus portion of the row crop attachment is applied to outer stalk guides of a row crop attachment.

One object of this invention is to provide a row crop attachment structure for a forage harvester overcoming the disadvantages of the prior art devices.

Another object of this invention is to provide a row crop attachment for a forage harvester which prevents the stalks of row to be cut from clinging to standing rows and being bent in the direction of standing rows around or across the machine.

Still, one other object of this invention is to provide a row crop attachment for a forage harvester having vertically disposed screw conveyor with augers with cutters on their lower portions to cut crop stalks near the ground and raise the lower end portion of the stalk to a point where a transverse screw conveyor having auger will move the stalk to a center portion of the attachment for entry into the forage harvester machine.

Yet, one object of this invention is to provide a row crop attachment for a forage harvester which has forwardly extending stalk guide portions on the outer portion thereof and a forwardly extending center stalk guide portion with the outer stalk guides being adjustable on the frame of the row crop attachment to provide for spacing thereof for use of the row crop attachment in harvesting rows of different width spacing.

Yet, another object of this invention is to provide a row crop attachment for a forage harvester and an attachment for a row crop attachment which has a rotatably mounted and powered shaft mounted on top of a stalk guide which in operation is normally adjacent to standing rows of a crop, the rotatable member having a helically wound member thereon and rotated to move stalk material into the row crop attachment and further having a rotated and powered knock-down roller disposed transversely at the upper end portion of the rotatable member to bend crop stalks generally forward relative to the direction of motion of the forage harvester and move them into the attachment and the intake portion.

Yet, another object of this invention is to provide a row crop attachment for a forage harvester which has a pair of vertically disposed augers to move stalks rearward into a point vertically disposed augers with knives on their lower portions to cut crop stalks near the ground and raise them to a transverse auger which moves them into a center portion of the attachment for entry into the forage harvester.

Various other objects, advantages and features of the invention will become apparent to those skilled in the art from the following discussion, taken in conjunction with the accompanying drawings, in which:

DESCRIPTION OF THE DRAWINGS

FIG. 5 is a side elevation view of the row crop attachment and forage harvester shown in FIG. 2, the view taken from the right-hand side of FIG. 2;

The following is a discussion and description of preferred specific embodiments of the row crop attachment structure of this invention, such being made with reference to the drawings, whereupon the same reference numerals are used to indicate the same or similar parts and/or structures. It is to be understood that such discussion and description is not to unduly limit the scope of the invention.

Description of Preferred Embodiments

Figures 11, 12:
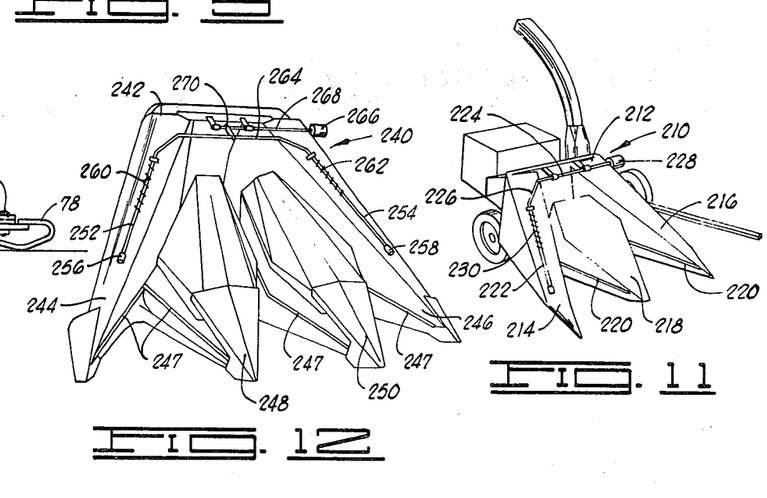
FIG. 11 is a reduced size perspective view of a pull type forage harvester having a row crop attachment, wherein the row crop attachment has a powered stalk moving apparatus mounted on a stalk guide member thereof.
FIG. 12 is a reduced size perspective view of a triple row type row crop attachment for a self-propelled type forage harvester with the row crop attachment having the powered stalk moving apparatus mounted therewith on the outer stalk guide members.

The row crop attachment for forage harvesters of this invention is shown in an embodiment, (1), thereof in FIGS. 1–10 and it is illustrated in great detail therein. A second screw conveyor having a pair of vertical augers are usable as an optional item to provide an auxiliary stalk moving device and such are shown in dashed lines in FIGS. 2–6. A portion of the row crop attachment of this invention is adaptable to some structures of existing row crop attachments and such is shown in FIGS. 11 and 12, as will be discussed in detail hereinafter.

Figure 1:
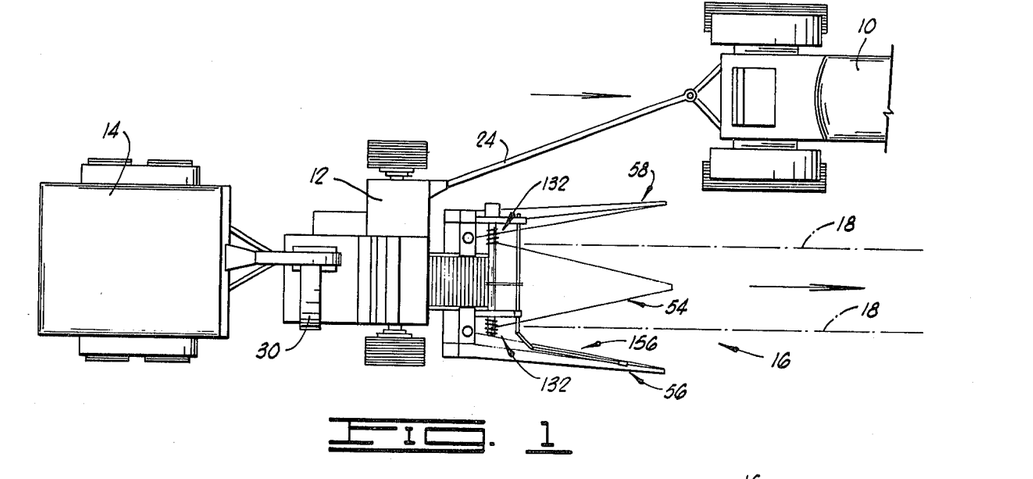
FIG. 1 is a top plan view of the rear portion of a tractor, a pull type forage harvester, and a trailer wherein the forage harvester has the row crop attachment of this invention mounted therewith.

Referring to the drawings in detail and in particular to FIG. 1, a tractor 10 is shown attached to a forage harvester 12 and a trailer 14 is attached to the rear of the forage harvester. The row crop attachment for forage harvesters of this embodiment, (1), of this invention is shown mounted on the forage harvester 12 and is generally indicated at 16. The dashed lines of FIG. 1 indicated at 18 illustrate rows of a crop being harvested by the forage harvester 12 with the row crop attachment 16.

Figure 2:
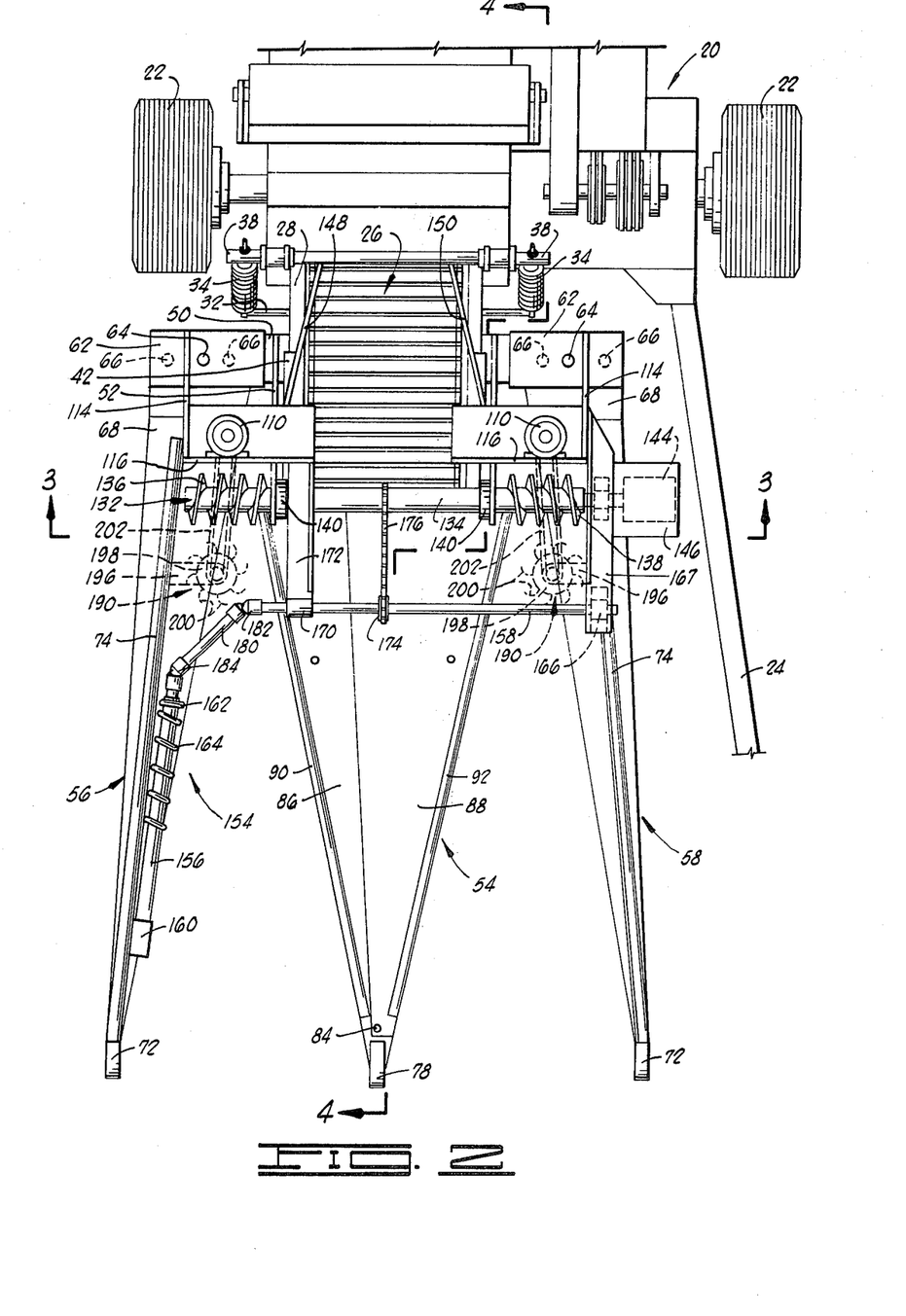
FIG. 2 is a top plan view of the pull type forage harvester shown in FIG. 1 with the row crop attachment of this invention mounted thereon, with only a forward portion of the forage harvester being shown and an auxiliary optional auger shown in dashed lines.
Figure 3:
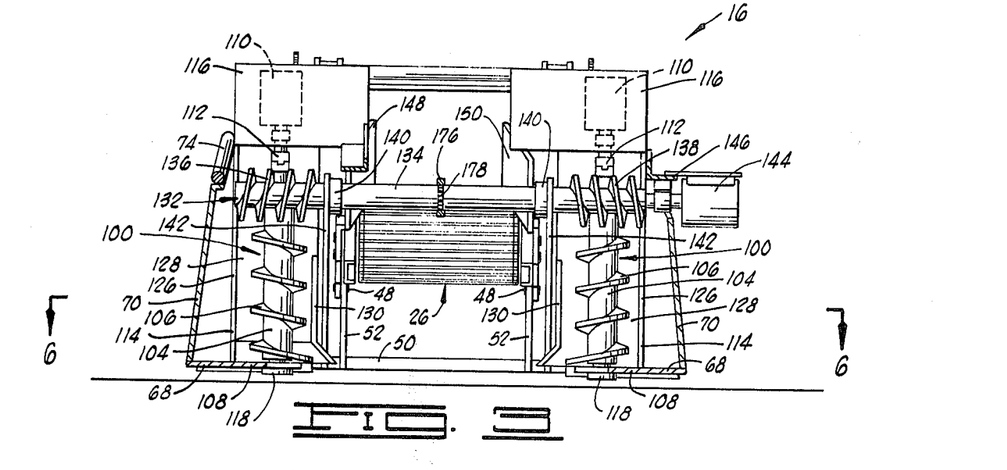
FIG. 3 is a vertical sectional view of the row crop attachment shown in FIG. 2, including the conveyor of the forage harvester, the view taken on line 3—3 of FIG. 2.
Figures 4, 7, 8, 10:
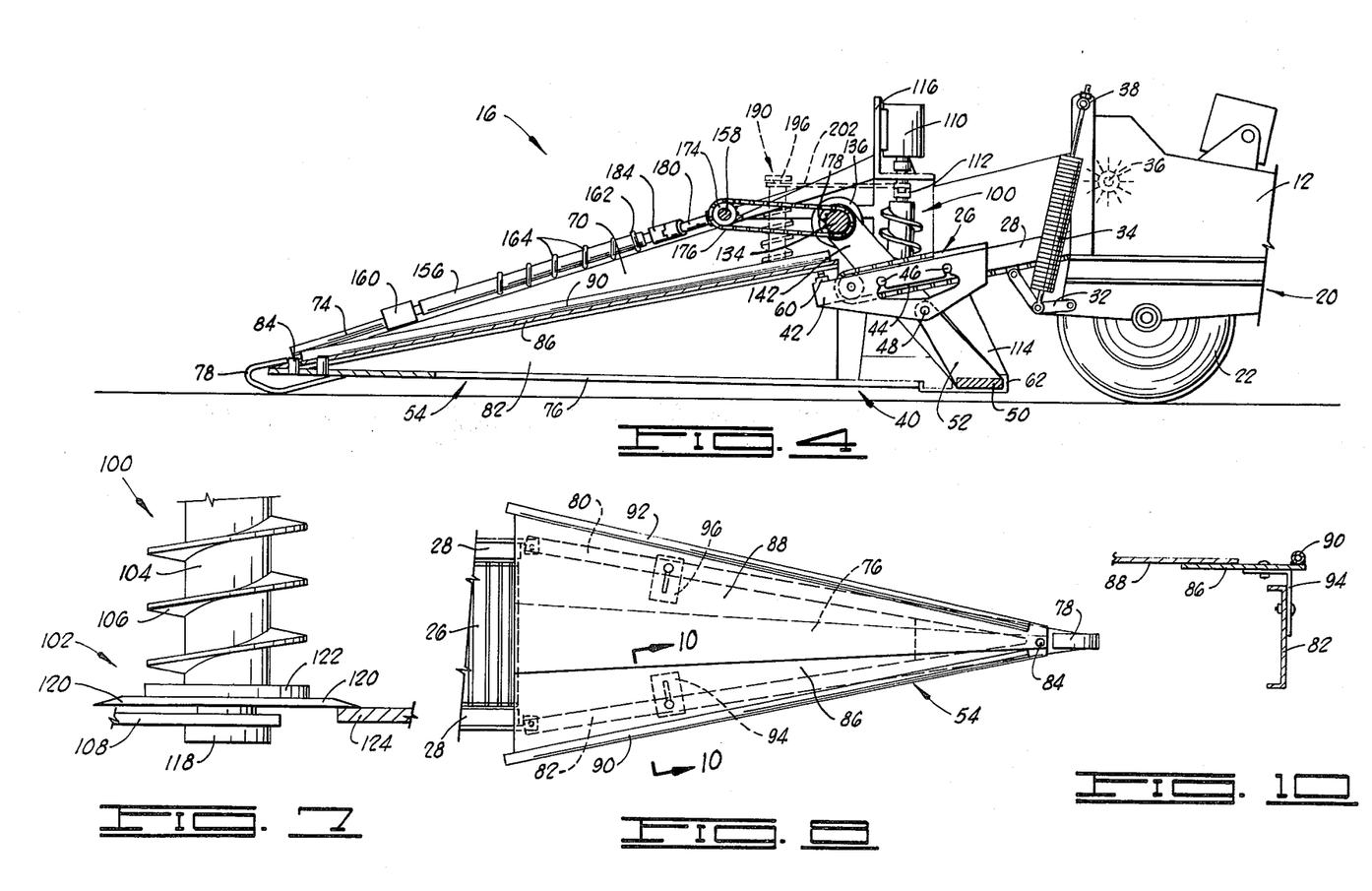
FIG. 4 is a vertical sectional view of the row crop attachment and forage harvester shown in FIG. 2, the view taken longitudinally through the structure on line 4—4 of FIG. 2.
FIG. 7 is an enlarged elevation view of a portion of a vertically disposed auger and knife assembly, the stationary portion of the knife assembly being shown in section for clarity.
FIG. 8 is a top plan view of the center stalk guide portion of the row crop attachment, including a portion of the conveyor of the forage harvester, with dashed lines indicating supporting structure for the center stalk guide top member and overlapping of the separate sections of the top member of the stalk guide.
FIG. 10 is a sectional view of the stalk guide center portion taken on line 10—10 of FIG. 8.

The forage harvester 12 on which the row crop attachment of this invention is used is constructed and adapted to mount a variety of attachments for the harvesting and/or handling of cut crops. The structure of the forage harvester 12 is of the pull type which is drawn behind a tractor when in use. The forage harvester 12 is provided with a frame structure, indicated generally at 20, supported above the ground by wheels 22 and connectable with a tractor by a draw bar 24 or tongue. The mechanism of the forage harvester includes a conveyor, indicated generally at 26, running and over a forwardly extending and pivotally attached conveyor support frame 28 to move harvested or collected material into a chopper portion of the apparatus (not shown) and from there to a blower portion 30 on the rear of the harvester which conveys the chopped material in a forced airstream to the trailer 14. The conveyor 26 is shown in FIGS. 2–4 and the blower in FIG. 1 of the forage harvester 12. The conveyor support frame 28 is pivotally attached to the forage harvester frame structure 20 on one end thereof (pivot point is not visible) and has a linkage 32 connected with a support spring 34 to vertically adjust the inclination of the conveyor support frame 28. A feed roll assembly having a feed roll, shown in dashed lines and indicated at 36 in FIG. 4, is positioned above and at the discharge end portion of the conveyor 26 in the harvesters housing to receive material from the conveyor and pass same into the chopper mechanism of the forage harvester. In the case of the pull type forage harvester 12 such is generally powered from the power take off of tractor or other towing vehicle by a drive shaft (not shown in the drawings). Adjustment of the conveyor support frame and the conveyor 26 in their angular position relative to the forage harvester frame 20 is accomplished by a threaded adjustment on the upper end of the spring 34 in its mounting with the spring support 38. The spring support 38 is a bar rigidly attached to the forage harvester frame as shown in FIG. 2.

The row crop attachment 16 has a frame structure, indicated generally at 40 in FIG. 4, which is removably mountable with the conveyor support frame 28 of the forage harvester 12. Referring to FIG. 4, the row crop attachment frame 40 has a frame mount portion 42 with mirror-image sides to be mounted on sides of the conveyor support frame 28. Apertures 44 in the frame mount sides are slotted on their upper portion to engage with projections 46 extending from the sides of the conveyor support frame 28. A carriage or transverse frame portion is pivotally attached to and positioned below the frame mount 42 with same attached at the pivot point mounts on the frame mount sides as indicated at 48. The carriage includes a carriage transverse beam 50 which is transverse to the row crop attachment structure and which has rigidly attached support members 52 connecting the beam 50 with the pivot point mounts 48 so the carriage will pivot relative to the frame mount 42. Referring to FIG. 2, the row crop attachment has three stalk guide assemblies including a center stalk guide assembly indicated generally at 54 and a pair of outer stalk guide assemblies indicated generally at 56 and 58. The stalk guide assemblies 54, 56 and 58 are structurally connected with the carriage portion of the row crop frame structure 40 so that they can be pivoted vertically in unison pivoting about the pivot point 48 to adjust their relative position above the ground level. Adjustment of the vertical position of the stalk guide members is accomplished by an adjustment screw 60 on the frame mount 42 at the outer end portion of the conveyor support frame 28. It is to be noted that the adjustment screw 60 limits downward movement of the forward end portion of frame 40 and not upward movement, this allows the stalk guides to be raised when their lower surfaces contact the terrain or a foreign object while in use.

Figure 6:
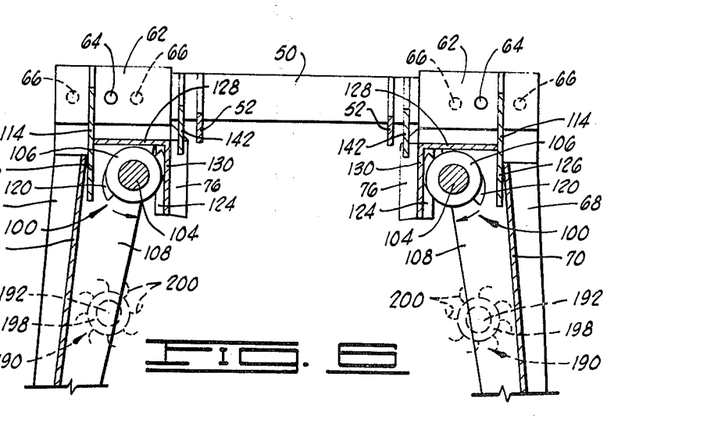
FIG. 6 is a horizontal sectional view of a portion of the row crop attachment alone, the view taken on line 6—6 of FIG. 3.
Figure 9:
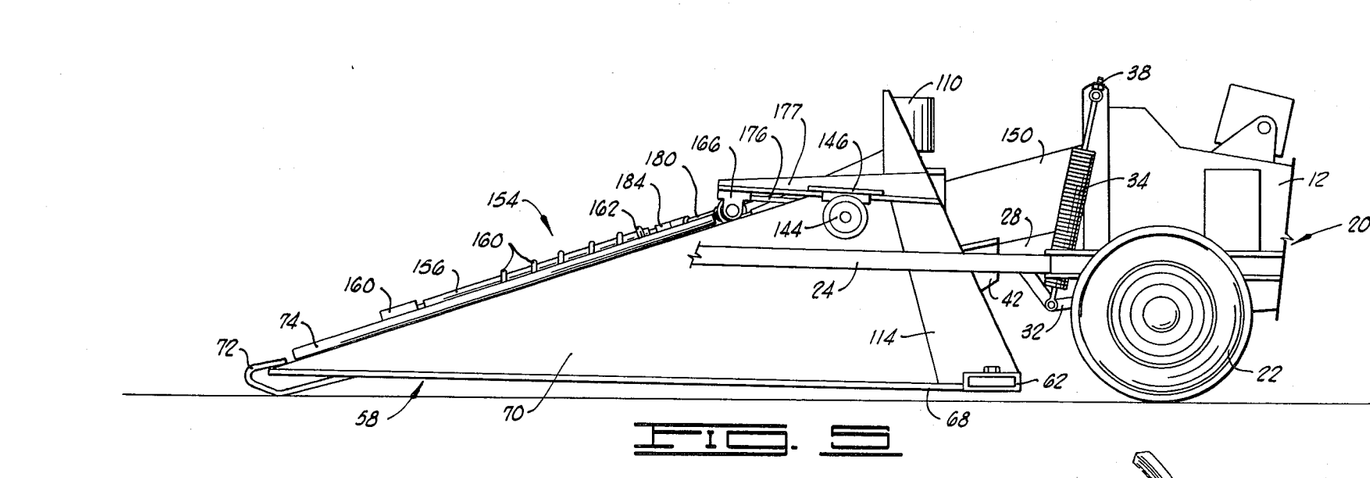
FIG. 9 is a side elevation view of the center stalk guide shown in FIG. 8, the view being without the conveyor portion of the forage harvester.
Figure 10:
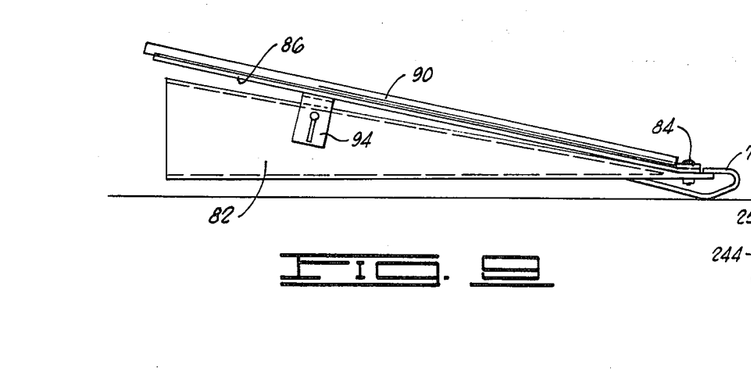

The outer stalk guides 56 and 58 are constructed similar in their mounting with the carriage portion of the frame 40 so that they can be moved inward and outward relative to the center of the row crop attachment for adjustment of the machine for different row spacings. Referring to FIG. 6, each of the outer stalk guides 56 and 58 are constructed similarly and bear similar numerals, they each have a slidable collar member 62 slidably mounted with the carriage transverse beam 50. The collar members 62 each have an aperture 64 to align with one of a plurality of apertures 66 in the transverse carriage beam 50. Preferably, three apertures are provided in the carriage transverse beam 50 in a spaced relation so that the row crop attachment 16 can have the stalk guides thereof positioned properly to be used to harvest row crops which have the rows spaced between approximately 28 inches apart and 40 inches apart. The basic structure of the outer stalk guides 56 and 58 is the same and such has a horizontal member 68 extending forwardly from the collar members 62 with an upright and generally triangularly shaped member 70 extending thereabove. A point ground contact runner 72 is secured to the outer forward end portion of each stalk guide point as shown in FIGS. 2 and 5. A round member 74 such as a pipe or the like is secured to the upper inclined portion of the stalk guide upright portion 70. The center stalk guide 54 has lower members 76 rigidly secured to the carriage transverse beam 50 as shown in FIG. 6 and extending forwardly therefrom to the point portion of the stalk guide at a ground contact runner 78. A pair of upright center stalk guide side members 80 and 82 attached to the lower members 76 and extend inwardly on their upper portion over the frame mount 42 and adjustment screw 60 on their rearward end portion. The lower members 76 are rigidly joined at the runner 78. A cover for the center stalk guide 54 is attached to its side members 82 and has a pair of overlapping panels 86 and 88 as shown in FIGS. 2, 8–10 with panel 88 being the uppermost. The panels 86 and 88 have rounded outer edge members 90 and 92, respectively. The panels 86 and 88 are attached to the upright side members 82 and 80, respectively, by slotted brackets 94 and 96 which have slots in the horizontal and vertical directions to provide for adjustment of the panels. When the spacing of the stalk guide outer members 56 and 58 is changed, the angular relation of the cover on the center stalk guide 54 must also be changed to provide a suitable entryway to the augers. Horizontal and vertical adjustment of the center stalk guide cover is accomplished by fasteners used to attach to the panels 86 and 88 of the cover and to their support members. In adjusting the panels 86 and 88 they pivot about a pivot point 84 on the ground contact runner 78. As can be seen in FIG. 4, the center stalk guide 54 is substantially vertically lower than the outer stalk guides 56 and 58 because the inlet to the forage harvester 12 is above its rear end portion and stalks move over the upper rear portion of the center stalk guide. FIG. 10 shows a sectional view taken on FIG. 8 of the overlapping panel arrangement for the center stalk guide 54. Preferably, bolts or the like are used to attach the panels 86 and 88 so they can be easily adjusted for varying the width of the center stalk guide cover in accordance with positioning of the outer stalk guides 56 and 58. It is to be noted that the size of the entryway can be varied at the option of the user and may be advantageous to widen or narrow the entryway to the augers by changing the position of the center stalk guide cover depending upon the particular crop which is being harvested with a forage harvester having the row crop attachment 16 of this invention.

The vertically disposed screw conveyor includes a pair of vertically disposed augers indicated generally at 100, positioned between the outer stalk guides 56 and 58 and the center stalk guide 54 in the rear portion of the row crop attachment 16. The vertically disposed augers 100 are helically flighted auger screws each having a rotary knife assembly 102 on their lower portion which in operation cuts the stalk of the crop. FIGS. 3, 4, 6 and 7 show in detail the structure of the vertically disposed augers 100. Each of the vertically disposed augers of the pair 100 are constructed similarly and bear similar numerals including a shaft 104 with spiral flighting 106 around the shaft 104 which is mounted on its lower end with a horizontal inner portion 108 of the outer stalk guides 56 and 58. The augers 100 are preferably rotated by hydraulic motors 110 connected by universal joints 112 with the auger shafts 104 on their upper end portions. The row crop attachment frame structure 40 has a pair of upright members 114 secured to the slidably mounted transverse beam collar members 62 and extending upwardly and forwardly therefrom. The hydraulic motors 110 are attached to transverse plates 116 secured to the upper end portion of the upright members 114.

FIG. 7 shows in detail the lower portion of an auger and the cutter or knife assembly indicated generally at 102 in a side view. FIG. 6 shows the knife assemblies 102 for each of the augers 100 in a top view. The auger shaft 104 is rotatably supported in a bearing 118 secured to the horizontal inwardly extending member 108 on the bottom of the outer stalk guides. A pair of oppositely outwardly extending knife blades 120 are secured to the auger shaft 104 at the bottom of the flighting 106 and have sharpened outer edge portions, as shown. The knife blades 120 are eccentric relative to the axis of rotation of the shaft 104 and have an upwardly extending circular peripheral guide member 122 secured to their outer upper edge portion immediately inward of the sharpened portion of the blade to guide the stalk ends during cutting. The cutting edges of the knives 120 run adjacent to a stationary member 124 which in combination with the sharpened edges of the knives functions in operation to cut the stalks of the crop. The stationary portion 124 is rigidly secured to the transverse beam collars 62 or other suitable structure to be positioned relative to the knives as shown in FIG. 7. When in operation the augers rotate in a counter clockwise direction as indicated by the arrows in FIG. 6 so that crop stalks are caught between the stationary portion 124 and the sharpened knives 120 as the augers 100 rotate and are cut with the portion of the stalk on top of the stationary member 124 being moved generally inward relative to the center of the row crop attachment 16. Both of the vertically disposed augers 100 are enclosed on three sides thereof by an outer side member 126, rear side members 128 and an inner side member 130 which are spaced closely adjacent to the peripheral portion of the auger flighting 106. The augers 100 are enclosed on three sides so that the butt portions of stalks will be pushed into the space between the auger flighting and the inner side members 130 and raised in this space by the augers 100 to the transverse auger assembly indicated generally at 132 and positioned transversely across the row crop attachment at the upper portion of the vertically disposed augers 100.

The transverse screw conveyor has a transverse auger apparatus 132 with a helically flighted auger screw having a shaft 134 with oppositely turned spiral flighting on its opposite end portions, the flighting segments indicated at 136 and 138. A pair of bearings 140 support the shaft 134 in a mid-portion thereof. The bearings 140 are secured to upwardly extending members 142 that are secured to the carriage transverse beam 50. The auger shaft 134 is rotated by a hydraulic motor 144 mounted with the row crop attachment structure on a bracket 146 extending from one of the upright side members 126. Preferably, a universal joint or coupler connects the hydraulic motor 144 with the end of the transverse auger shaft 134. In operation the transverse auger 132 is rotated in the counterclockwise direction when seen from the position shown in FIG. 4. When the row crop attachment 16 is in operation, the transverse auger 132 moves the butt end of the stalks to the center portion of the row crop attachment onto the conveyor 26. In the center portion of the row crop attachment structure behind the transverse auger and the vertically disposed augers 100 is a pair of vertically disposed stalk directing baffles 148 and 150 on opposite sides of the conveyor 26 to direct the stalks into the inlet of the forage harvester 12 and more specifically into the feed roll 34 thereof. The baffles 148 and 150 are secured to the frame mount 42 and remain stationary relative to the conveyor support frame 28.

The stalk moving assembly is generally indicated at 154 and includes a rotatable member 156 mounted on the stalk guide 56 and a rotatable knock-down roller 158 extending transversely across the stalk guides spaced ahead of the transverse roller assembly 132. The rotatable member 156 is supported on its lower end at a mount 160 and by another mount 162 on its upper end portion, and it has a spiral flighting 164. The rotatable member 164 is rotated via the knock-down roller 158 which is driven from the transverse auger assembly 132. The knock-down roller 158 has a rotatable mount 166 on a forwardly extending member 167 above the stalk guide 58 and is supported in a second rotatable mount 170 on a forwardly extending arm member 172 extending from the vertically disposed auger support structure. The knock-down roller is provided with a sprocket 174 and a chain 176 connecting it with another sprocket 178 on the transverse auger shaft 134. A short shaft 180 and a pair of universal joints 182 and 184 connect one end of the knock-down roller 158 and the drive end of the rotatable member 156 so rotatable member 156 will rotate with the knock-down roller 158. Preferably, the spiral flighting 164 is on the upper or rearward portion of the rotatable member 156. In practice a large diameter wire or the like wound in spiraling fashion on the exterior of the rotatable member has been found satisfactory. When the row crop attachment 16 is in operation, the rotatable member 156 of the stalk moving assembly 154 will function to move crop stalks inward relative to the space between the stalk guides 56 and 54 and generally rearward on the rotatable member 156 due to the spiral flighting 164 and direction of rotation thereof. Preferably, the rotatable member 156 rotates in a clockwise direction when seen from the end thereof supported by mount 160. As stalks move rearward on the rotatable member 156, they are contacted by the short shaft 180 and the knock-down roller 158 which due to the direction of its rotation forces the stalks rearward and downward onto the conveyor 26. Since the knock-down roller and short shaft 180 are substantially ahead of the transverse auger 132 the stalks are bent in a generally forward direction prior to the base portion of the stalk being cut by the knife assembly 102. When in operation, the stalk moving assembly 154 functions to pull the stalks of the row of the crop away from the stalks of the standing rows of the crop which pass the side of the row crop attachment 10. This prevents the stalks of the row which is to be cut from bending over the side of the stalk guide 56 adjacent to the standing rows of the crop and becoming tangled or plugging that side of the row crop attachment 10.

An optional or second screw conveyor apparatus having an auger assembly is shown in FIGS. 2, 4 and 6 in dashed lines, indicated generally at 190, positioned vertically ahead of the transverse auger assembly 132. The optional auger assembly 190 includes a pair of generally vertically disposed helically flighted auger screws usable with the row crop attachment 16 of this invention at the option of the user. Functionally, the auger assembly 190 rotates when the row crop attachment is in use and pulls material generally rearward and upward into the vertically disposed auger assembly augers 100 and the transverse auger assembly 132. Use of the optional auger assembly aids in material flow through the row crop attachment 16 by moving it rearward in a directed manner after the stalks are bent by the knock-down roller. Use of the optional auger assembly is particularly advantageous when crop stalks are relatively short and are not tall enough to contact the knock-down roller. Preferably the augers 190 are constructed to be removably mountable with the row crop attachment 10 so they can be added if necessary and removed when not needed depending upon the particular crop being harvested.

The optional auger assembly includes the pair of vertically disposed augers 190 mounted with the outer stalk guides 56 and 58 and powered from the hydraulic motors 110. The augers 190 have a shaft or center member 192 supported in a mount on their lower end at the horizontal inwardly extending members 108 and by mount members 196 attached to the upper portion of the stalk guides 56 and 58.

The augers 190 have spiral flighting 198 extending substantially the length thereof and they have a plurality of curved or partially arcuate fingers 200 extending outwardly from the bottom thereof as shown. Flighting 198 of the augers 190 is preferably highly inclined as shown in FIG. 4 so it will have a tendency to move material rearward as well as upward. The fingers 200 are rigidly secured to the augers 190 and in use contact the lower portion of the crop stalks moving them rearward in the direction of the vertically disposed augers 100 and the knife assemblies 102. Each of the augers 190 are separately powered from the hydraulic motors 110 by a chain drive apparatus, with the chain indicated at 202. Rotation of the augers 190 is preferably the same as the other augers 100 so material is moved generally rearwardly into the center portion of the row crop attachment 16 and particularly in the direction of the augers 100.

When the row crop attachment 16 is mounted with the forage harvester for use, it is connected with the tractor 10 and a trailer 14 as shown in FIG. 1. The hydraulic motors 110 and 144 are connected with the hydraulic system of the tractor by hoses or the like. Preferably, the hydraulic motors are connected with a suitable fluid regulating system so that their speed can be varied as needed depending upon the particular crop which is to be harvested. Prior to operation of the forage harvester with the row crop attachment 16, the position of the point portions of the stalks guides 54, 56 and 58 should be adjusted so the ground contact skids 72 and 78 on the stalk guides either run on the ground or so they are spaced above it as desired. Pivotal adjustment of the stalk guides 54, 56 and 58 is accomplished by the adjustment screws 60 on the frame mount 42 with the stalk guides pivoting about the pivot mount 48 on the lower portion of the frame mount. Depending upon the spacing of the rows of the crop to be harvested the outer stalk guides 56 and 58 can be adjusted in their relative horizontal spacing to match the spacing of the rows of the crop. Adjustment of the stalk guides 56 and 58 is accomplished by sliding the collar members 62 on the carriage transverse beam 50 and securing same as described above. To complete adjustment of the spacing of the stalk guides 56 and 58 the top or cover of the center stalk guide 54 must necessarily be adjusted as described above so that the crop stalks will flow properly into the augers. Once all adjustments have been completed, the forage harvester 12 is ready to be used. When the row crop attachment 16 is in operation, the stalks of two rows of the crop to be harvested pass into the spaces between the outer stalk guides 56 and 58 and the center stalk guide 54 whereupon the stalks are bent in a generally forward direction by the stalk moving apparatus 154 and particularly the knock-down roller 158; as the stalks are bent in a generally forward disposed direction, the base portion of the stalk is severed slightly above ground level by the knife assembly 102 and the lower or butt end portion of the stalk is moved upward by the vertically disposed augers 100 to the transversely disposed auger 132 where it is moved to the center portion of the attachment structure onto the forage harvester conveyor 26. In the event the optional augers 190 are used the stalks of the crop are contacted by the fingers 200 and flighting 198 and moved rearwardly after being bent forwardly if the stalks are tall enough to be bent. Once the lower or butt end portions of the stalks are on the conveyor 26, they move in a generally rearward direction between the baffles 148 and 150 of the chute to the inlet of the forage harvester 12 whereupon they are grasped by the feed rolls 36 and further passed into the chopper, blower, etc. It is to be noted that during operation of the row crop attachment 16 of this invention, the crop stalks move rearwardly and upwardly and no forward motion of the stalks is required to get the butt end portion of the stalks onto the conveyor of the forage harvester or into the feed rolls thereof. The rotatable member 156 of the stalk moving assembly 154 functions to prevent stalks in the row adjacent to standing rows of the crop from bending over or wrapping around that side portion of the apparatus as is described above in the prior art devices. When the row crop attachment 16 is pulled through the field, the ground contact skids 72 and 76 on the stalk guides can be set to run on the ground or they can be spaced slightly thereabove as desired by the user. It is to be noted that when there is a rise in the terrain, the skids 72 and 78 will slide on the ground and pivot the stalk guides and attached portions of the row crop attachment about the pivot point 48 on the frame mount 42 thereby preventing the point portions of the stalk guides from digging into the ground and at the same time continuing to cut the crop stalks at approximately the same spacing above ground level as on the terrain previously. The speed of rotation of the vertically disposed augers 100 and the transverse auger assembly 132 will depend on the particular crop being cut and the speed with which the forage harvester 12 is moved through the field and this is best determined by the user for the particular conditions at hand when using the row crop attachment of this invention. In practice it has been found that rotation speed of the augers 100 can be approximately 1,000 r.p.m.

Another embodiment, (2), of the row crop attachment of this invention is shown in FIG. 11 and indicated generally at 210 wherein such applies the stalk moving apparatus of the row crop attachment 16 to a conventional two row crop attachment 212. A pull type forage harvester is shown in FIG. 11 with the row crop attachment 212 mounted thereon. The row crop attachment 212 has a pair of outer stalk guides 214 and 216 and a center stalk guide 218 with gathering chains 220 mounted on them to move material in the spaces between them. The apparatus 210 of this embodiment, (2), of this invention, includes a rotatable member 222 mounted atop the outer stalk guide member 214 with a transversely positioned rotatable knock-down roller 224 connected thereto and mounted on the upper or rearward portion of the row crop attachment structure. The knock-down roller 224 is connected by universal joints and short angularly positioned shaft 226 with the rotatable member 222. Powering of the rotatable member 222 is accomplished by a hydraulic motor 228 or suitable equivalent connected with the knock-down roller 224. The rotatable member 222 is provided with spiral flighting 230. Preferably the spiral flighting 230 is on the upward or rearward disposed end portion of the rotatable member 222. Rotation of the rotatable member 222 by the hydraulic motor 228 is clockwise as seen from the lower end thereof so it will cause stalks contacting the upper or inside portions of the rotatable member 222 to be moved in the direction of the center portion of the row crop attachment. The knock-down roller 224 is positioned to bend the stalks of the crop to be harvested in a generally forwardly disposed direction prior to their butt end portions being raised or placed in position to be drawn into the inlet of the forage harvester.

In normal operation a conventional two row type row crop attachment such as the one shown in FIG. 11 has the gathering chains 220 on the adjacent portions of the stalk guides 214, 216 and 218 to grasp the lower end portions of the stalks of the crop to be cut and move then rearwardly into the machine. The rotatable member 222 and spiral flighting 230 will prevent stalks from bending around or over the outer portions of the row crop attachment structure. It is to be noted that the two row type of row crop attachment 212 shown in FIG. 11 can be used with the pull type forage harvester or it can be used with a self-propelled type of forage harvester and likewise the apparatus 210 of this embodiment can be used with either type of forage harvester. Depending upon the structure and mechanism of the specific forage harvester used the knock-down roller 224 and rotatable member 222 can be powered by the hydraulic motor or they can be powered from the mechanism of the machine.

Another embodiment, (3), of the row crop crop attachment of this invention is shown in FIG. 12 and indicated generally at 240 wherein such applies the stalk moving apparatus of the row crop attachment 16 to a conventional multi-row type row crop attachment for a forage harvester. The row crop attachment is a multi-row type attachment for harvesting two or more rows of a crop. In FIG. 12 the attachment shown is a three row type attachment indicated at 242. The row crop attachment 242 includes a pair of outer stalk guides 244 and 246 and a pair of inner stalk guides 248 and 250 positioned between the outer stalk guides so the row crop attachment can accommodate three rows of a crop. The stalk moving apparatus as applied to this row crop attachment 242 has a pair of rotatable members 252 and 254 rotatably mounted on the outer stalk guides 244 and 246, respectively. Gathering chains run in tracks on the adjacent portions of the stalk guides with such indicated at 247, and in use group crop stalks and move them rearwardly into the attachment. The lower end of the rotatable members 252 and 254 are supported in mounts 256 and 258 on their lower ends, respectively, and they are each provided with spiral flighting 260 and 262 secured on their upper or rearward portions, respectively. The upper or rearward portion of each rotatable member 252 and 254 are attached to the stalk guide structure by mounts. A knock-down roller 264 is connected by short angularly positioned shafts with the rotatable members 252 and 254 as shown. A hydraulic motor 266 or other suitable equivalent is used for powering the stalk moving assembly and such is connected by a jack shaft 268 and connecting roller chain assembly 270 with the knock-down roller 264. The jack shaft 268 is rotatably supported by mounts attached to the structure of the row crop attachment. When in operation the hydraulic motor 266 rotates the jack shaft 268 and the knock-down roller 264 such that the rotatable members 252 and 254 are rotated clockwise and counterclockwise, respectively, to move stalk material in the direction of the center portion of the row crop attachment 242. The direction of rotation of the rotatable member 252 is clockwise when seen from the end of the mount 256 and for the rotatable member 254 it is counterclockwise when seen from the end of the lower mount 258. When the row crop attachment 242 is mounted on a self-propelled forage harvester and it moves through a field, it can be driven through the field through a central portion thereof of the field where standing rows of the crop will be on both sides of the machine and of the row crop attachment. The apparatus 240 of this invention will prevent stalks of the outer two rows being cut from bending around or over the outer stalk guides 244 and 246 of the row crop attachment. The knock-down roller 264 operates to bend the stalks of the crop being cut in a generally forward direction as they move to the rear portion of the row crop attachment. It is to be understood that the jack shaft 268 can be rotated by connecting same with the rotary power mechanism of the forage harvester through mechanical connections if desired rather than using the described hydraulic motor 266. Also, the row crop attachment 242 and apparatus 240 can be used on a pull type forage harvester if desired. And the stalk moving apparatus 240, particularly the rotatable members can be used on row crop attachments for having one or more rows.

In the use and operation of the row crop attachment structure of this invention, including the stalk moving apparatuses thereof, it is seen that same provides a new and useful improvement in farm machinery and particularly in alleviating an unsolved problem with row crop harvesting machines. The row crop attachment of this invention functions neatly to cut crop stalks at a base portion of the stalk and move the stalk into the inlet of a forage harvester for chopping and further handling. The stalk moving apparatus portion of the invention prevents stalks of rows adjacent to standing rows in the field from being bent around or over the side of the row crop attachment adjacent to such standing rows which heretofore has been an unsolved problem associated with row crop harvesting machines. In the operation of the row crop attachment of this invention, the stalks are bent in a generally forwardly disposed direction prior to cutting, and when they are cut such stalks are raised and moved to a central portion of the attachment by screw conveyors having helically flighted auger screws whereupon they are transferred to a conveyor of the forage harvester for carrying into the forage harvester. Inasmuch as the row crop attachment is adjustable in its transverse spacing, it can be properly adjusted so that the spacing of the stalk guides matches the spacing of the rows of the crop to be cut which guarantees ultimum performance of the machine. Inasmuch as the row crop attachment of this invention is shown in a configuration for handling two rows it is obvious that such can be easily adapted for single row machines and other multiple row machines. In the adaptation of the stalk moving apparatus to conventional row crop attachments, such provides a means for preventing the stalks of a row of the crop adjacent to the standing rows of the crop from being wrapped around or over the adjacent portions of the attachment structure. In such adaptation it is seen that the stalk moving apparatus of the invention can be applied to single row and multiple row type row crop attachments to improve their operation.

In the manufacture of the row crop attachment structure of this invention, it is obvious that the row crop attachment structure can be manufactured so as to be adaptable for easy attachment and removal from forage harvesters. The row crop attachment is structurally less complicated than some prior art devices and can be constructed easily by manufacturing techniques of the type used to produce farm equipment. In the adaptation of the stalk moving apparatus to conventional row crop attachments, such can be applied to the conventional structures in a kit form for existing machines or can be constructed along with the machine as it is initially manufactured.

As will become apparent from the foregoing description of the applicant's row crop attachment for forage harvesters, relatively simple and novel means have been provided to harvest row crops. The row crop harvester structure is mechanically less complicated than prior art devices and functions in a superior manner as it has a stalk moving apparatus to prevent stalks of the row crops being cut from bending over or wrapping around the machine in the direction of adjacent standing rows of the crop. The row crop attachment is versatile in that it is adjustable for different row spacings to obtain optimum performance from the machine. In the adaptation of the stalk moving apparatus to conventional row crop harvesting machines, such provides an improvement for the conventional machines which prevents stalks from wrapping around exterior portions of the machines when in use.

While the invention has been described in conjunction with preferred specific embodiments thereof, it will be understood that this description is intended to illustrate and not to limit the scope of the invention, which is defined by the following claims.

I claim:

1. In a common forage harvester, a row crop attachment therefor, comprising:
   a. a frame means mountable on a forage harvester,
   b. a generally vertically disposed conveyor means mounted on said frame means to in use move material upwardly,
   c. cutting means mounted on a lower portion of said vertically disposed conveyor means to in use cut crop stalks when lower end portions thereof enter said lower portion of said vertically disposed conveyor means,
   d. generally transverse conveyor means mounted on said frame means disposed adjacent to an upper forward portion of said generally vertically disposed conveyor means, said generally transverse conveyor being communicably connected with an inlet of said forage harvester to deliver cut forage thereto,
   e. stalk guide means mounted on said frame means having a forwardly extending portion, and
   f. stalk moving means having a powered rotatable member mounted on an upper portion of said stalk guide means forwardly extending portions, the forage harvester in operation with said attachment operatively mounted thereon receiving the stalks of a crop to be cut and harvested by said stalk guide means and stalk moving means, said cutting means cutting said stalks close to the ground, said generally vertically disposed conveyor means raising the resulting cut stalks to a position to be received by said generally transverse conveyor means, and said last-named conveyor means moving the stalks into the inlet of said forage harvester.

2. The row crop attachment of claim 1, wherein:
   a. said generally vertically disposed conveyor means has a pair of generally vertically disposed auger screws rotatably mounted on opposite sides of said frame,
   b. said cutting means has rotary knife members mounted on lower portions of said vertically disposed auger screws,
   c. said transverse conveyor means has an auger screw rotatably mounted on said frame to in use move material to said forage harvester inlet,
   d. said stalk guide means has a pair of outer stalk guide portions on opposed sides of said frame means, a center portion mounted on a central portion of said frame means between said outer stalk guide portions.

3. The row crop attachment of claim 2, wherein:
   a. said vertically disposed auger screws and said stalk guide means outer portions are transversely movably mounted on said frame means,
   b. said transverse auger means has opposite helical flighting on outer end portions of said auger screw,
   c. said vertically disposed auger screws have helical flighting, and
   d. said cutting means has a blade portion secured to the lower end portion of each of said vertically disposed auger screws, and a stationary blade portion secured to said frame means.

4. The row crop attachment of claim 3, wherein:
   a. said stalk moving means has a powered knockdown roller portion rotatably mounted on said stalk guide means transverse to the normal direction of motion of said forage harvester to in use contact crop stalks and bend same in a generally forwardly disposed direction,
   b. said rotatable member has helical flighting thereon to in use move material generally rearward and inward relative to the central portion of said row crop attachment, and
   c. said frame means has a frame mount securable to said forage harvester and a transverse frame portion vertically pivotally attached said frame mount, said vertically disposed conveyor means, said cutting means, said transverse conveyor means and said stalk guide means being mounted on said transverse frame portion.

5. The row crop attachment of claim 4, wherein:
   a. said vertically disposed auger screws are mounted on said stalk guide means outer portions,
   b. said stalk guide means outer portions are transversely movably mounted on opposed end portions of said transverse frame portion, and
   c. said stalk guide means center portion has a frame rigidly secured to said transverse frame portion, same said frame having a pointed forward end portion and having an expandable top mounted on said stalk guide means center portion frame.

6. The row crop attachment of claim 1, wherein:
a. a second vertically disposed conveyor means is mounted on said frame means forward of said transverse conveyor means.

7. The row crop attachment of claim 6, wherein:
a. said second vertically disposed conveyor means has a pair of vertically disposed helically flighted auger screws mounted on said stalk guide means, and
b. said pair of auger screws each having a plurality of prong members extending outwardly from a lower portion thereof.

8. In a row crop attachment for a forage harvester having a means to gather crop stalks and a forwardly extending crop stalk guide member, that improvement comprising stalk moving means having,
a. a powered rotatable stalk moving member mounted on and disposed over an upper portion of said forwardly extending stalk guide member to in operation contact crop stalks and guide same into said means to gather crop stalks,
b. powering means mounted with said row crop attachment and said stalk moving member to rotate said stalk moving member, and
c. a transverse knock-down roller means rotatably mounted on said stalk guide member in position generally transverse thereto, said knock down roller means being connected to said stalk moving member to rotate therewith.

9. The stalk moving means of claim 8, wherein:
a. said stalk moving member extends substantially the length of said stalk guide member with helical flighting on a portion thereof, and
b. said means to gather crop stalks has an entryway portion communicably connected to an inlet of said forage harvester, said knockdown roller means is disposed generally above and forward of said entryway portion.

10. The stalk moving means of claim 8, wherein:
a. said row crop attachment has at least two stalk guide members, and
b. said stalk moving means has a pair of stalk moving members, one mounted on each of the outermost stalk guide members of said row crop attachment.

11. The stalk moving means of claim 10, wherein:
a. said stalk moving means has said powered knockdown roller means rotatably mounted on a rear portion of said row crop attachment and being connected with said stalk moving members to rotate therewith,
b. said stalk moving members have helical flighting on a portion thereof, and
c. said means to gather crop stalks has an entryway portion communicably connected to an inlet of said forage harvester, said knock-down roller is disposed generally above and forward of said entryway portion.

* * * * *